United States Patent [19]

Hodgetts et al.

[11] Patent Number: 4,983,963

[45] Date of Patent: Jan. 8, 1991

[54] ELECTROMAGNETIC COMMUNICATION INTERFACE

[75] Inventors: John L. Hodgetts, Rochford; Martin J. Hodson, Rayleigh, both of England

[73] Assignee: The Raytel Group Limited, Essex, England

[21] Appl. No.: 359,401

[22] Filed: May 31, 1989

[30] Foreign Application Priority Data

Mar. 1, 1989 [GB] United Kingdom ............. 8904644

[51] Int. Cl.⁵ ............. G08C 19/16; E05F 11/00; H04Q 7/00

[52] U.S. Cl. ............. 340/870.31; 49/360; 340/825.54

[58] Field of Search ............. 340/870.31, 825.54, 340/687, 545, 547, 551, 870.32, 825.69, 825.72; 49/280, 139, 213, 360

[56] References Cited

U.S. PATENT DOCUMENTS

| | | |
|---|---|---|
| 3,758,845 | 9/1973 | MacKelvie et al. ............. 340/870.31 |
| 4,074,246 | 2/1978 | Conklin et al. ............. 340/545 |
| 4,076,039 | 2/1978 | Hartsock ............. 340/870.31 |
| 4,381,506 | 4/1983 | Linn et al. ............. 340/870.31 |
| 4,630,044 | 12/1986 | Polzer ............. 340/825.72 |
| 4,640,050 | 2/1987 | Yamagishi et al. ............. 49/280 |
| 4,862,375 | 8/1989 | Talmadge ............. 340/870.31 |
| 4,888,585 | 12/1989 | Kamiya et al. ............. 340/825.54 |

Primary Examiner—Donald J. Yusko
Assistant Examiner—Yuk H. Lau

[57] ABSTRACT

An electromagnetic communication interface including two units each of which contains a coil and associated circuit means. One of the units also includes a core positioned within the coil of that unit and having a free end which may be inserted into the coil of the other unit. When this is done, a magnetic flux link is provided between the two coils and the two circuit means may communicate with one another. The first unit may be mounted on a vehicle body and the second unit on a sliding door of the vehicle. It may be arranged for the magnetic flux link to be formed when the door is closed. A "door-open" signal, generated, for example, by a passenger pressing a push button on the door, may be transmitted via the magnetic flux link to a door opening mechanism mounted on the vehicle body.

3 Claims, 4 Drawing Sheets

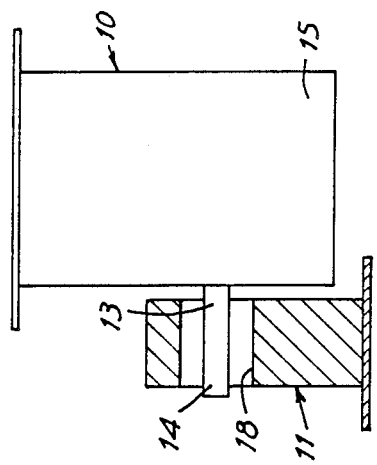
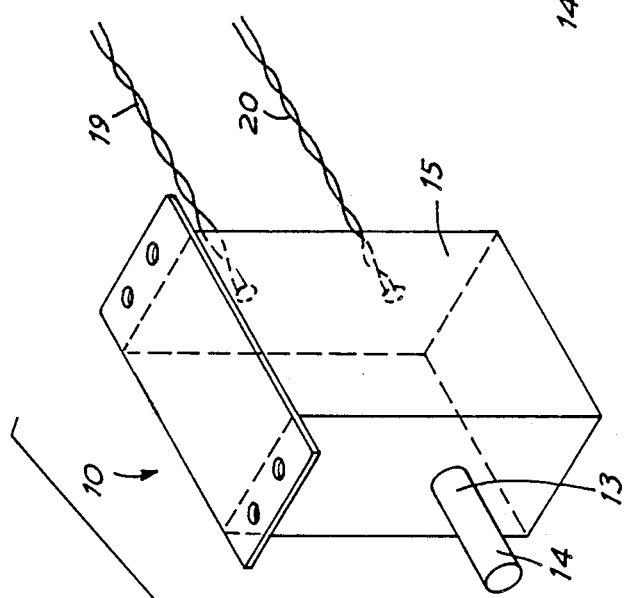

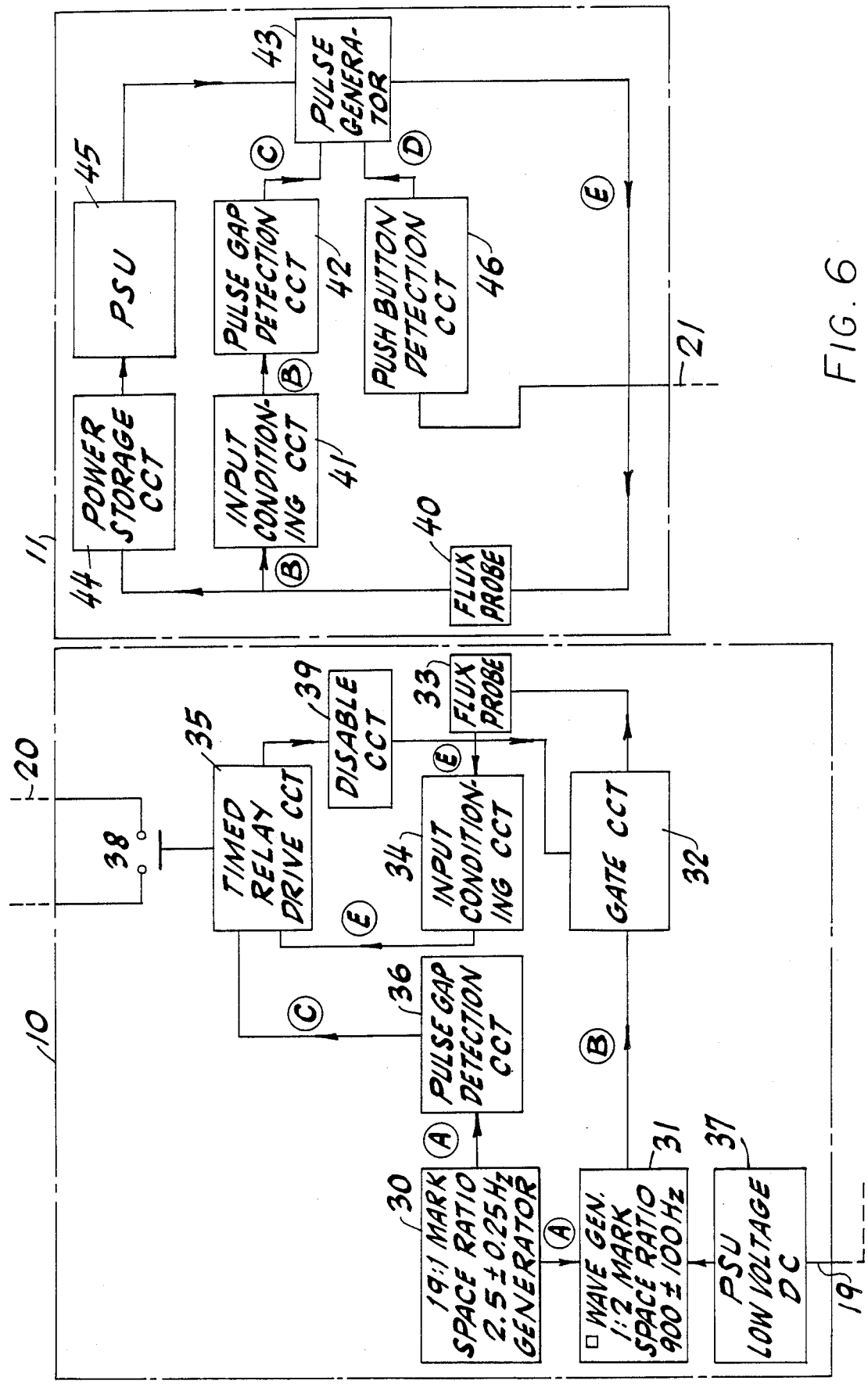

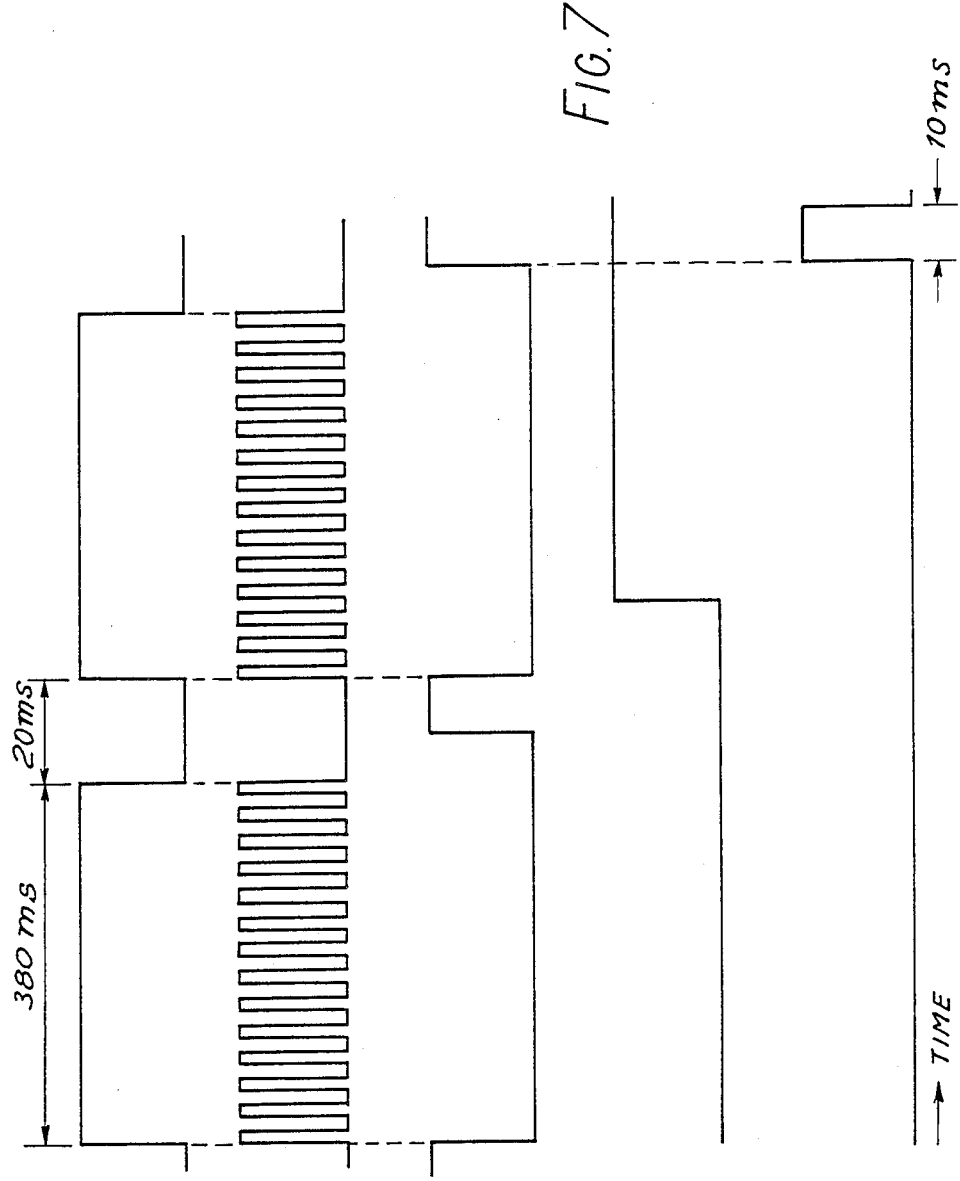

ELECTROMAGNETIC COMMUNICATION INTERFACE

BACKGROUND OF THE INVENTION

This invention relates to an electromagnetic communication interface suitable for providing communication between a movable object, such as the sliding door of a railway carriage, and a stationary object, such as the body of the railway carriage on which the sliding door is mounted.

Mechanical communication interfaces are known. For example, in FIG. 1 there is shown in diagrammatic form a door opening system incorporating a mechanical communication interface. A railway vehicle 1 comprises a body 2 having a sliding door 3. The door is shown in a partially open position in the Figure. When the door is closed, contacts 4 complete an electrical circuit between a push-button 5 and a control circuit 6. Thus, when the door is closed, a passenger may push the button 5 and an instruction signal will pass via the mechanical contacts 4 to electrical control circuitry 6 in order to instruct a door opening mechanism 7 to open the door.

The above described door opening system incorporating the mechanical communication interface (i.e. the mechanical contacts 4) requires accurate initial setting up in view of the fact that the contacts 4 on the door 3 and the contacts 4 on the vehicle body 2 must be aligned such that they come into contact with each other when the door 3 is closed. In use, such an arrangement has proved to be unreliable and excessive maintenance is required in order to achieve the necessary operational reliability.

SUMMARY OF THE INVENTION

According to the present invention, an electromagnetic communication interface comprises:

a first unit including a first coil and first circuit means for modulating the magnetic flux produced by the first coil and/or for responding to modulations of the magnetic flux cutting the first coil;

and a second unit movable relatively to the first unit and including a second coil and second circuit means for modulating the magnetic flux produced by the second coil and/or for responding to modulations of the magnetic flux cutting the second coil;

wherein one of the first and second units also includes a core positioned within the coil of the said one unit and having a free end projecting out of said coil;

whereby, when the free end of the core is inserted into the coil of the other of the first and second units, the magnetic flux produced by the first coil cuts the second coil and/or the magnetic flux produced by the second coil cuts the first coil, thereby enabling the first circuit means to communicate with the second circuit means and/or the second circuit means to communicate with the first circuit means.

In the context of a sliding door of a vehicle, one of the units may be mounted on the vehicle body and the other unit on the sliding door. Usually, it will be arranged for the unit mounted on the sliding door to be adjacent to the other, stationary unit mounted on the vehicle body when the door is closed. Thus, one way communication between the body and door or vice versa, or two way communication between the body and door, may be provided. In this way, a "door-open" instruction signal may be communicated from the door when it is at its closed position to the vehicle body in order to instruct the control circuitry and the door opening mechanism to open the door.

As there need be no mechanical contact between the core and the coil into which it is inserted when the door is at the closed position, the initial alignment of the two units during assembly of the door onto the vehicle body is less critical than the alignment needed for the prior art mechanical communication interface. Also, because there need be no touching components, the electromagnetic communication interface of the present invention will not experience mechanical wear or sparking and the accumulation of dirt will be less damaging. Hence the equipment will be more reliable than the prior art interface and therefore require less frequent maintenance, leading to a saving in maintenance costs.

Preferably, the modulation effected by the first circuit means and/or the second circuit means is pulse modulation. This has been found to be particularly effective. It may be arranged for the second unit to be powered only by energy derived from the magnetic flux produced by the first coil of the first unit. In this way, an external power source for the second unit does not have to be provided. If the second unit is mounted on the sliding door, then the provision of such an external power source for the second unit would be complicated and space-consuming. For this reason, it is particularly recommended that the second unit should be the unit that is mounted on the sliding door.

The second circuit means may include energy storage means for storing the energy derived from the magnetic flux produced by the first coil of the first unit. In this way, the functioning of the second circuit means is not limited by the instantaneous rate of energy transfer from the first coil of the first unit.

Preferably, the first circuit means includes power input means connectable to an external power source and is arranged to modulate the magnetic flux produced by the first coil into groups of first pulses. Preferably, the second circuit means includes input signal input means and is arranged, in response to the input signal input means receiving an input signal and upon detecting a gap between the groups of first pulses of the magnetic flux produced by the first coil cutting the second coil, to use energy stored in the energy storage means to modulate the magnetic flux produced by the second coil into a second pulse; and the first circuit means includes output signal output means and is arranged, upon detecting the second pulse of the magnetic flux produced by the second coil cutting the first coil, to output an output signal from the output signal output means.

If the first unit is mounted on the vehicle body and the second unit on the sliding door, then the input signal received by the second unit may comprise a "door-open" instruction signal and the output signal produced by the first unit may be a signal for activating the door mechanism to open the sliding door.

The first circuit means may be arranged to disconnect the first coil from the power input means for the duration of the output signal. In this way, energy is saved and the energy efficiency of the electromagnetic communication interface increased.

BRIEF DESCRIPTION OF THE DRAWINGS

The invention will now be described by way of example with reference to the accompanying drawings, in which:

FIGS. 4 and 5 are perspective and part sectional side views respectively of the electromagnetic communication interface;

FIG. 6 is a block circuit diagram of the electromagnetic communication interface; and, FIG. 7 shows signals appearing in the circuit of FIG. 6.

DESCRIPTION OF THE PREFERRED EMBODIMENT

In FIGS. 2 to 6, the electromagnetic communication interface of the present invention is shown installed in a railway vehicle having a sliding door. However, the electromagnetic communication interface of the present invention is equally applicable to any situation where communication is required between a movable object and its surroundings at a particular point.

Figure 2:
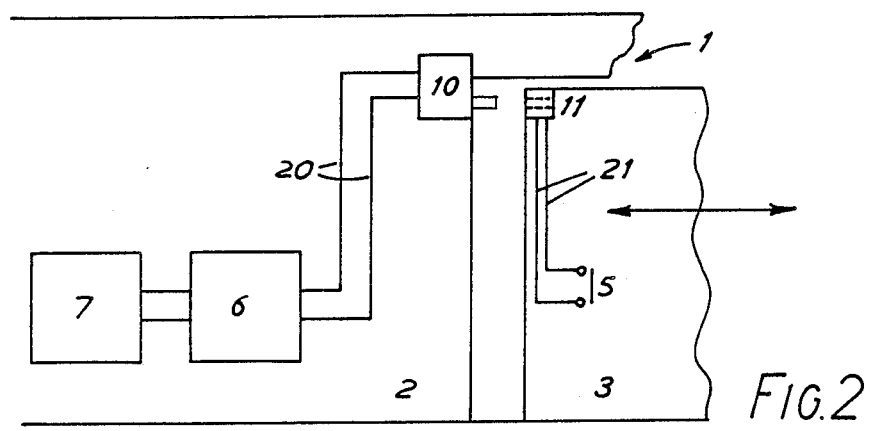
FIG. 2 is a diagrammatic view of a door opening system incorporating an electromagnetic communication interface in accordance with the present invention.
Figure 3:
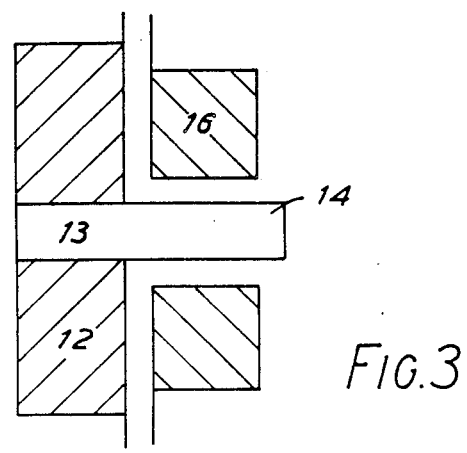
FIG. 3 is a diagrammatic sectional view of the two coils and core forming part of the electromagnetic communication interface of FIG. 2.

Referring to FIG. 2, a railway vehicle 1 comprises a vehicle body 2 and a sliding door 3. The electromagnetic communication interface of the present invention comprises a first unit 10 mounted on the vehicle body 2 and a second unit 11 mounted on the sliding door 3. Referring to FIGS. 2 to 5, the first unit 10 contains a first coil 12 rigidly attached to the base of a core 13. A free end 14 of the core 13 projects out of a housing 15 of the first unit.

Figure 1:
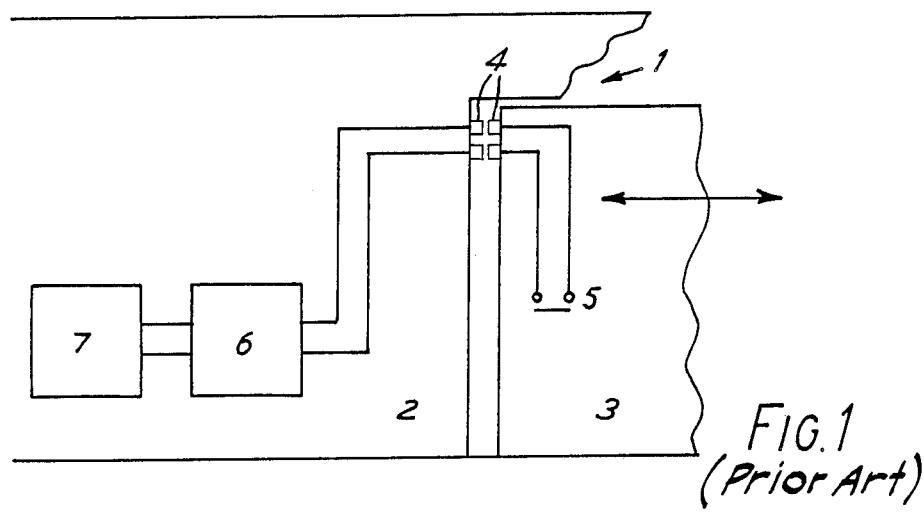
FIG. 1 is a diagrammatic view of a door opening system incorporating a known mechanical communication interface.

The second unit 11 contains a second coil 16 within a housing 17. The central aperture of the coil 16 is unobstructed and forms part of an aperture 18 extending through the housing 17. It may readily be seen from FIGS. 4 and 5 that the diameter of the free end 14 of the core 13 is considerably less than the diameter of the aperture 18 into which it is insertable when the sliding door 3 has slid to the closed position. Because of this difference in diameter, the alignment of the first and second units 10,11 when mounting them on the vehicle body 2 and sliding door 3 is less critical than for the prior art mechanical communication interface (see FIG. 1) where the mechanical contacts 4 had to be aligned exactly, in order to ensure completion of the circuit from the push-button 5 when the sliding door 3 was at its closed position.

Furthermore, the electromagnetic communication interface of the present invention does not involve any mechanical, i.e. frictional, contact between relatively movable components in order to ensure communication. In other words, the free end 14 of the core 13 does not touch the side wall of the aperture 18 when inserted therein (see FIG. 5). Thus, the electromagnetic communication interface of the present invention offers reliability and reduces the frequency of routine maintenance.

Referring to FIG. 4, the first unit 10 is connectable to an external power source via a power line 19 and is arranged to produce an output signal (e.g. a signal to activate the sliding mechanism of the sliding door to open the sliding door) on an output control signal line 20. The second unit 11 is arranged to receive an input signal (e.g. a "door-open" signal from a push-button) on an input control signal line 21.

Referring to the circuit diagram of the electromagnetic communication interface shown in FIG. 6 and the accompanying signal chart shown in FIG. 7, the first unit 10 comprises a mark space ratio generator 30 producing a pulse signal A, see FIG. 7, at a nominal frequency of 2.5 Hz and a mark space ratio of 19:1. For the sake of clarity, the signals shown in FIG. 7 are not drawn to scale and are merely diagrammatic, although the relative timings of the signals are correctly shown.

The signal A is fed to a wave generator 31 that produces internally a nominal 900 Hz pulse signal with a 1:2 mark space ratio. This internal 900 Hz signal is gated by the signal A to produce an output signal B comprising groups of 900 Hz pulses. Each group has a duration of 380 ms and the groups are separated by gaps of 20 ms duration. Signal B is fed through a gate circuit 32, the purpose of which will be explained later, and into a flux probe 33 that is in practice realised by the first coil 12 and the core 13 shown in FIGS. 3 to 5.

The second unit 11 includes a flux probe 40 that is in practice realised by the second coil 16. When the flux probes 33,40 are in electromagnetic contact, i.e. when the sliding door 3 is closed and the free end 14 of the core 13 is inserted into the second coil 16, the magnetic flux produced by the flux probe 33 will be modulated by the signal B and have a similar waveform. This modulated flux will cut the flux probe 34 and generate an output signal that may be considered to be analogous to signal B. This signal is fed through an input conditioning circuit 41 and is fed into a pulse gap detection circuit 42 which detects the gaps between the groups of pulses and produces an output signal C indicating when the gaps have been detected.

As can be seen from FIG. 7, the gap detection signal C does not appear immediately upon the start of a gap between the groups of pulses but a short time, say 10 ms, after the start of the gap. The gap detection signal C terminates upon commencement of the next group of pulses. Signal C is fed into a pulse generator 43.

The unconditioned signal B output from the flux probe 40 is also fed into a power storage circuit 44 which extracts energy from the signal B and stores it, e.g. by means of a capacitor. A power supply unit 45 is provided to supply the power stored by the storage circuit 44 to the pulse generator 43 and, although not shown, to the other components of the second unit 11 to satisfy their power needs.

The input signal line 21, from the push-button 5 on the sliding door 3 (see FIG. 2), is fed into a push-button detection circuit 46 which produces an output signal D upon receiving an indication via the line 21 that the push-button 5 has been pressed to instruct door opening. When both signals C and D are received by the pulse generator 43, a single pulse signal E, see FIG. 7, is produced by means of using the energy stored in the power storage circuit 44 and supplied via the power supply unit 45. The pulse signal E, of 10 ms duration, is fed back to the flux probe 40 in order to generate a corresponding pulse of magnetic flux by means of the second coil 16 of the flux probe 40. The resultant pulse of magnetic flux cuts the first coil 12 in the flux probe 33 and hence a signal corresponding to the pulse signal E is output by the flux probe 33.

It should be noted from FIG. 7 that, because the pulse gap signal C must be present in addition to the push-button detection signal D before the pulse E is generated, the pulse E is generated in a gap between the groups of 900 Hz pulses of the signal B.

The signal E is fed from the flux probe 33 to an input conditioning circuit 34 and then into a relay drive circuit 35. A pulse gap detection circuit 36 analogous to the pulse gap detection circuit 42 of the second unit 11 produces from the signal A a pulse gap detection signal analogous to the signal C output by the circuit 42. When both signals C and E are present, the relay drive circuit 35 closes contacts 38 and completes the output control signal line 20 for a pre-set period of time, and also dissables the gate circuit 32, via a disable circuit 39, in order to cut off the supply of signal B to the flux probe 33. This reduces the power consumed by the first unit 10.

The first unit 10 also includes a power supply unit 37 which powers the wave generator 31 and, although not shown, the other components of the first unit requiring a power input. Power is fed into the power supply unit 37 from an external source via the power line 19.

Returning to FIG. 2, the circuit output line 20 is connected to electrical control circuitry 6 which, upon the contacts 38 being closed and hence receiving an output signal via the line 20, instructs the door opening mechanism 7 to open the sliding door 3.

We claim:

1. An electromagnetic communication interface comprising:
   a first unit including a first coil and first circuit means for modulating the magnetic flux produced by the first coil and for responding to modulations of the magnetic flux cutting the first coil, the first circuit means including power input means connectable to an external power source and arranged to modulate the magnetic flux produced by the first coil into groups of first pulses;
   and a second unit movable relatively to the first unit and including a second coil and second circuit means for modulating the magnetic flux produced by the second coil and for responding to modulations of the magnetic flux cutting the second coil; the second circuit means including energy storage means for storing the energy derived from the magnetic flux produced by the first coil of the first unit;
   wherein one of the first and second units also includes a core positioned within the coil of the said one unit and having a free end projecting out of said coil, whereby, when the free end of the core is inserted into the coil of the other of the first and second units, the magnetic flux produced by the first coil cuts the second coil and the magnetic flux produced by the second coil cuts the first coil;
   wherein the second circuit means includes input signal input means and is arranged, in response to the input signal input means receiving an input signal and upon detecting a gap between the groups of first pulses of the magnetic flux produced by the first coil cutting the second coil, to use energy stored in the energy storage means to modulate the magnetic flux produced by the second coil into a second pulse; and
   wherein the first circuit means includes output signal output means and is arranged, upon detecting the second pulse of the magnetic flux produced by the second coil cutting the first coil, to output an output signal from the output signal output means.

2. An electromagnetic communication interface according to claim 1, wherein the second unit is arranged to be powered only by energy derived from the magnetic flux produced by the first coil of the first unit.

3. A vehicle comprising:
   a vehicle body;
   a door movably mounted on the vehicle body so as to be movable from a first position to a second position;
   an electromagnetic communication interface comprising:
      a first unit including a first coil and first circuit means for modulating the magnetic flux produced by the first coil and for responding to modulations of the magnetic flux cutting the first coil, the first circuit means including power input means connectable to an external power source and arranged to modulate the magnetic flux produced by the first coil into groups of first pulses;
      and a second unit movable relatively to the first unit and including a second coil and second circuit means for modulating the magnetic flux produced by the second coil and for responding to modulations of the magnetic flux cutting the second coil; the second circuit means including energy storage means for storing the energy derived from the magnetic flux produced by the first coil of the first unit;
      wherein one of the first and second units also includes a core positioned within the coil of the said one unit and having a free end projecting out of said coil, whereby, when the free end of the core is inserted into the coil of the other of the first and second units, the magnetic flux produced by the first coil cuts the second coil and the magnetic flux produced by the second coil cuts the first coil;
      wherein the second circuit means includes input signal input means and is arranged, in response to the input signal input means receiving an input signal and upon detecting a gap between the groups of first pulses of the magnetic flux produced by the first coil cutting the second coil, to use energy stored in the energy storage means to modulate the magnetic flux produced by the second coil into a second pulse; and
      wherein the first circuit means includes output signal output means and is arranged, upon detecting the second pulse of the magnetic flux produced by the second coil cutting the first coil, to output an output signal from the output signal output means;
   the first unit being mounted on the vehicle body, the second unit being mounted on a door of the vehicle and the first unit and the second unit being arranged so that, when the door is at its first position, a free end of the core is inserted into the coil of said other of the first unit and the second unit;
   input signal generating means mounted on the door for generating an input signal in response to actuation by a user and for supplying the input signal to the input signal input means of said second unit; and
   door movement means mounted on the vehicle body and responsive to the output signal output by the output signal output means of the first unit to move the door from its first position to its second position.

* * * * *